Nov. 15, 1960   C. A. BONNER, JR., ET AL   2,960,041
MOVABLE TABLE RUN-OUT AND RETURN APPARATUS
Filed Aug. 13, 1956   6 Sheets-Sheet 1

INVENTORS
Charles A. Bonner, Jr.
William J. Blaser
BY Oscar L. Spencer
ATTORNEY

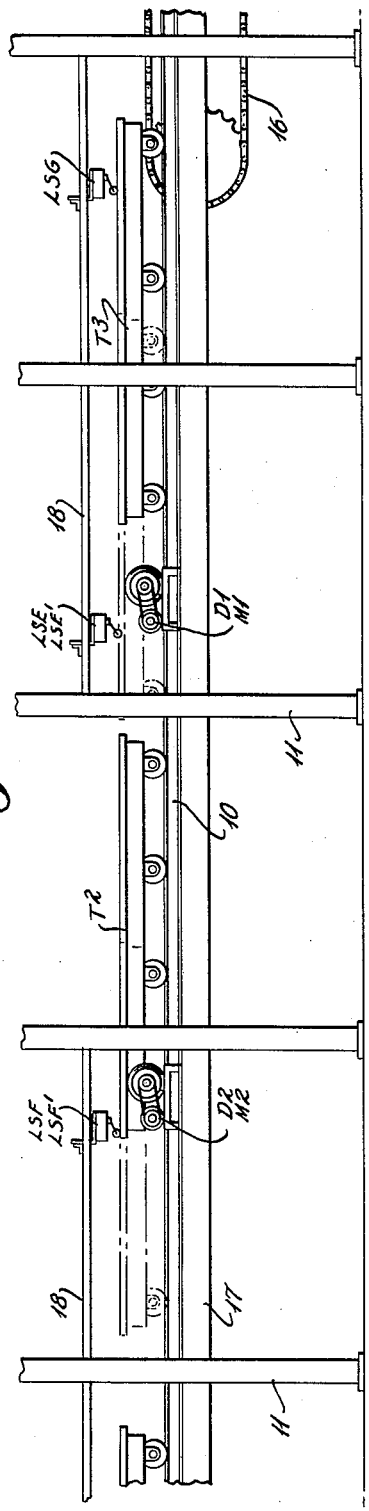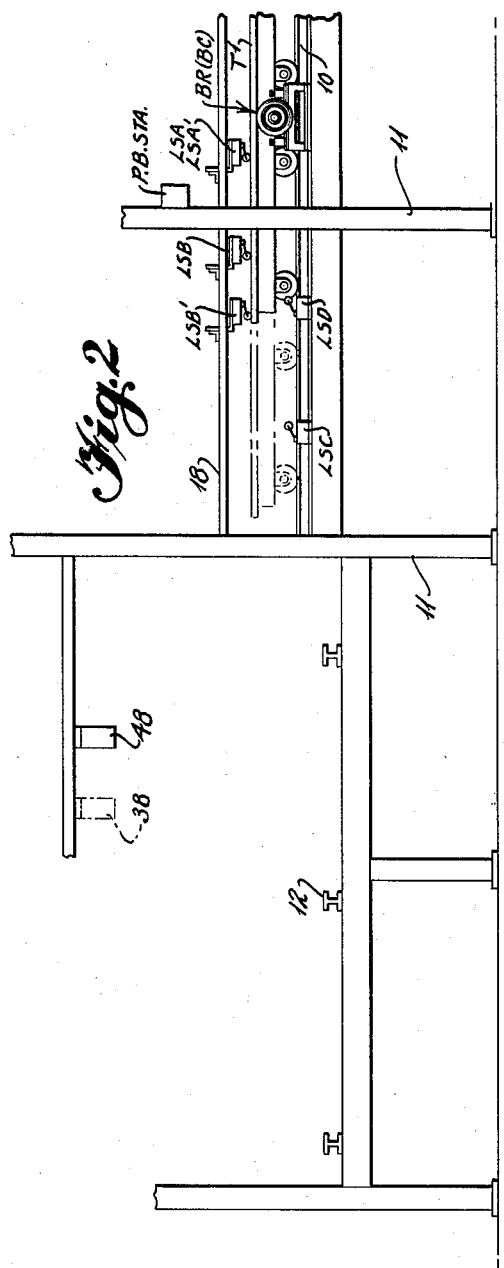

Nov. 15, 1960 C. A. BONNER, JR., ET AL 2,960,041
MOVABLE TABLE RUN-OUT AND RETURN APPARATUS
Filed Aug. 13, 1956 6 Sheets-Sheet 3
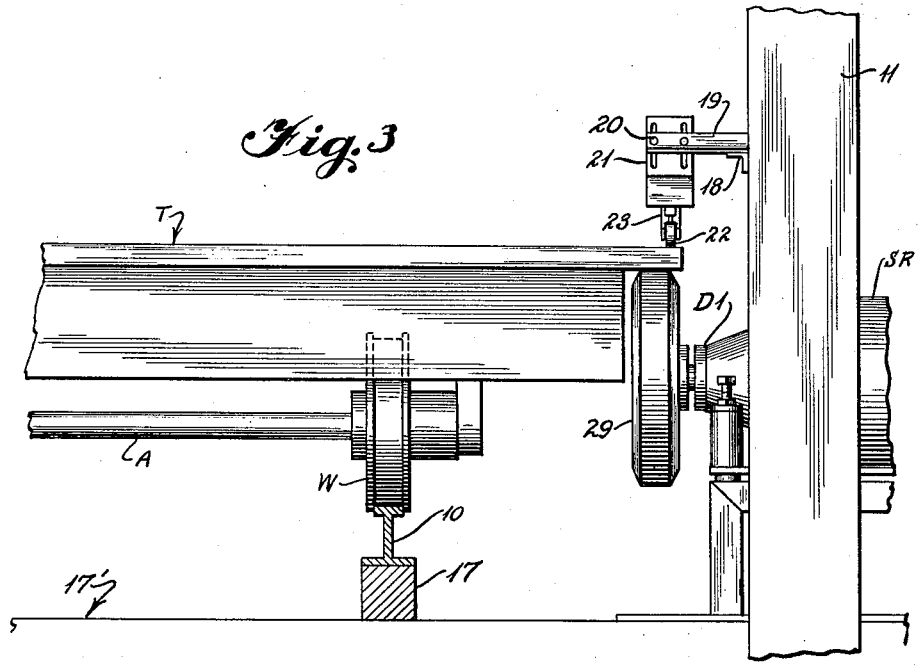
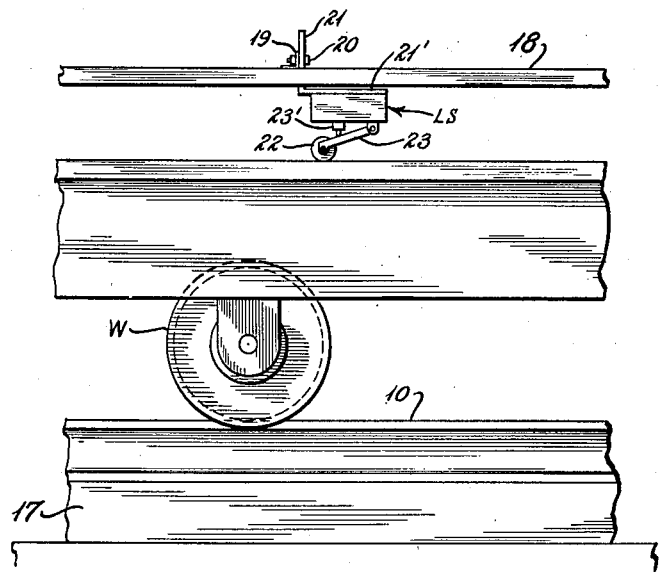
INVENTORS
Charles A. Bonner, Jr &
William J. Blaser
BY Oscar L. Spencer
ATTORNEY

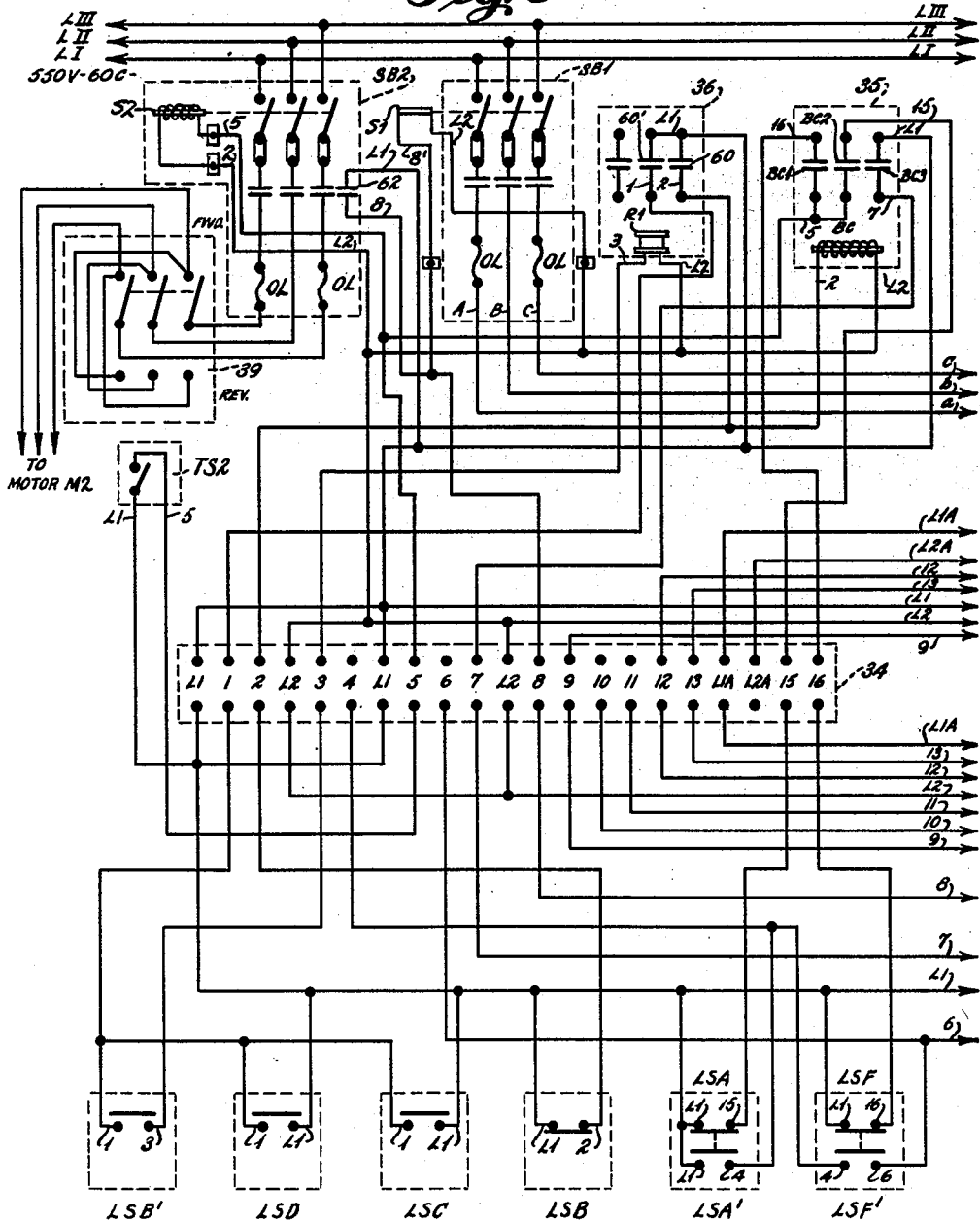

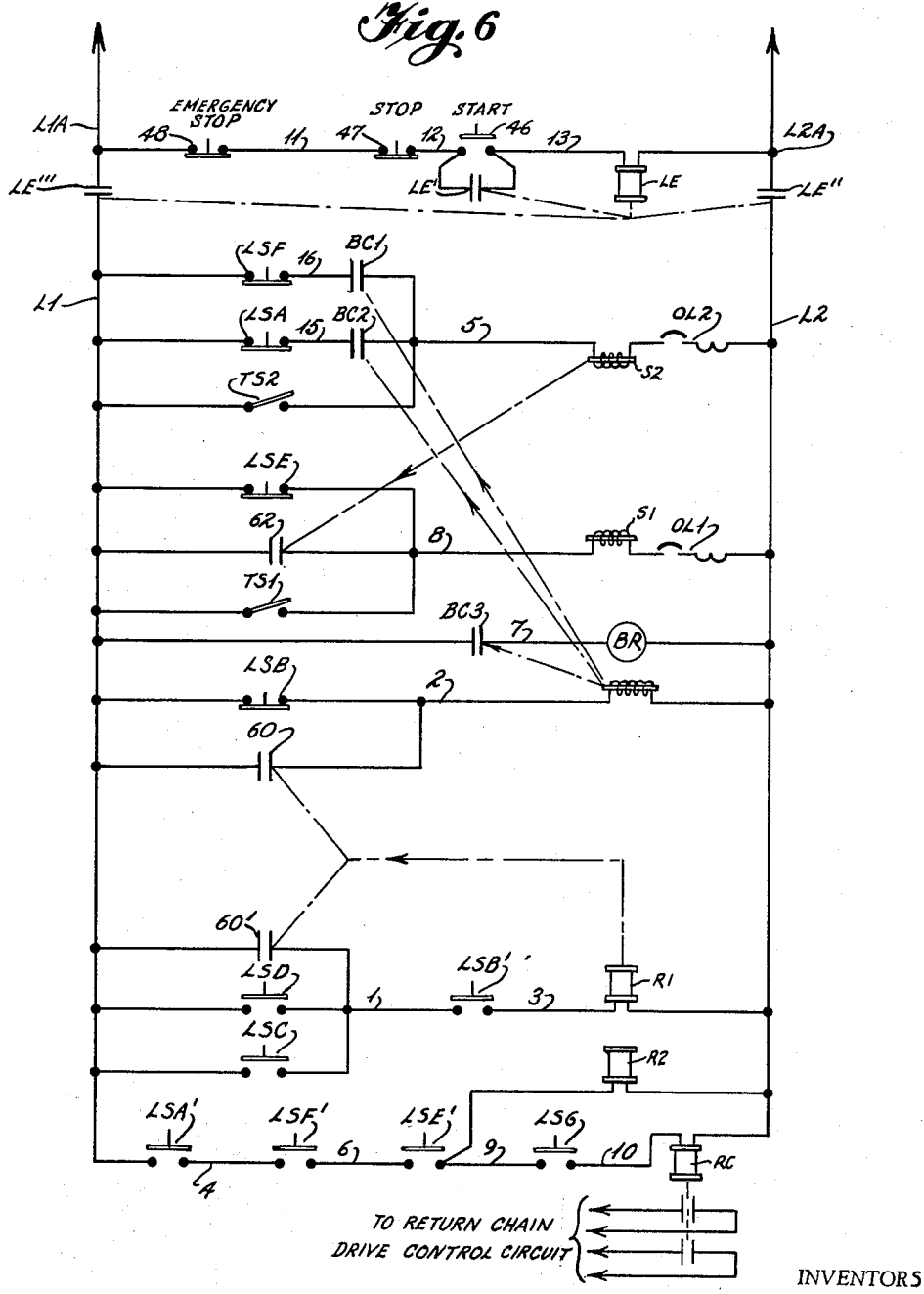

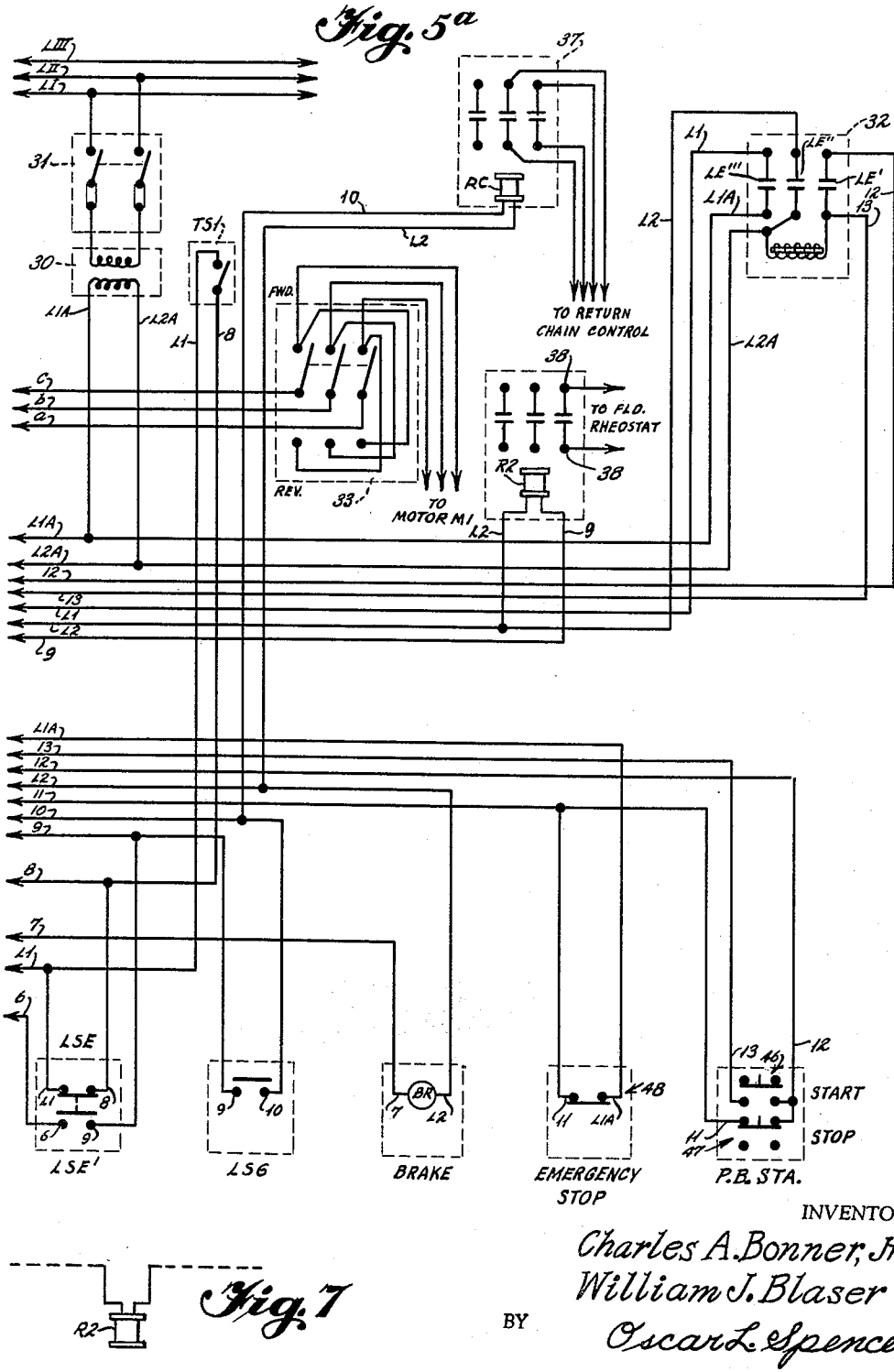

United States Patent Office 2,960,041
Patented Nov. 15, 1960

2,960,041

MOVABLE TABLE RUN-OUT AND RETURN APPARATUS

Charles A. Bonner, Jr., Ford City, and William J. Blaser, Kittanning, Pa., assignors to Pittsburgh Plate Glass Company, County of Allegheny, Pa., a corporation of Pennsylvania Filed Aug. 13, 1956, Ser. No. 603,738

13 Claims. (Cl. 104—88)

This invention is directed to a drive mechanism for successively moving tables or cars on tracks and particularly to improvements in apparatus for moving tables after they leave a glass grinding and polishing line. This application is a continuation-in-part of copending application of Charles A. Bonner, Serial No. 454,433, filed September 7, 1954, now U.S. Patent 2,874,644, issued February 24, 1959.

In the manufacture of plate glass and sheet glass of certain kinds, the plates or sheets are placed on movable tables which are moved along on tracks under grinding and polishing stations by means of an endless chain positioned under the movable tables. In order to utilize the tables again, they are moved on down the track at the end of the endless chain by means of butting one table against another. At the end of the track there is a transverse transfer track and a transfer locomotive which moves the tables across to a return track to bring them back so that they may be used again in the grinding and polishing line. In order to carry out this method of handling the tables, it is necessary that a number of tables be used such that they abut one another between the end of the endless chain and the transfer track in order that they may be moved along as each table comes off from over the endless chain. So, also, by this method of returning the tables to the grinding and polishing line, the tables bump against each other in their movement and become damaged.

It is an object of this invention to provide improved controls for drive mechanisms so placed along the track and at the end of the endless chain that the tables are run-out by this drive mechanism in successive steps without having the tables bump each other and without requiring that the track be totally filled with abutting tables.

Another object of this invention is to include among such control means a braking or retardation mechanism for interrupting the movement of the tables as necessary.

A further object of this invention is to provide control mechanism for the driving units such that unless the track is sufficiently clear ahead a car or table will not be moved.

A still further object of this invention is to provide control apparatus wherein a transfer locomotive may enter the run-out track and automatically release the brake mechanism acting on the outermost car or table and further cooperating brake control mechanism which is operated by such a table to hold the brake released while the table is being moved out of its end position on the track.

Still further objects and the entire scope of applica-
bility of the present invention will become apparent from the detailed description given hereinafter. It should be understood, however, that the detailed description and specific examples are given by way of illustration only, and, while indicating preferred embodiments of our invention, are not given by way of limitation, since various changes and modifications within the spirit and scope of our invention will become apparent to those skilled in the art from this detailed description.

For a more complete understanding of the nature and scope of the invention, reference may be had to the following detailed description taken in connection with the accompanying drawings, in which—

Fig. 2 is a side elevation showing the end of the transfer track and the extreme end of the run-out track with a table approaching the end of the run-out track;

Fig. 2a is a side elevation of the right-hand end of the run-out track of Fig. 2 with additional tables thereon over the table drive mechanisms with one table shown just leaving the return chain in the grinding and polishing line;

Fig. 3 is an enlarged view of a table on the run-out track and a cooperating drive unit and limit switch mounting;

Fig. 4 is a side elevation of a table as in Fig. 3 showing a fragment of the table and its cooperation with a limit switch mounted thereabove;

Fig. 5 is the left-hand end of a circuit diagram which placed along the left-hand side of Fig. 5a shows the control for two drive units and the braking mechanism along with the limit switches for the tracks and the tables shown in Figs. 1–4;

Fig. 5a is the right-hand end of the circuit diagram referred to in Fig. 5;

Fig. 6 is a simplified circuit diagram of the control of the motor, brake and certain relays shown in Figs. 5 and 5a and showing the normal position of the limit switches; and Fig. 7 is a circuit diagram of relay R2 shunted across a field rheostat.

Throughout the description like reference numerals and reference characters refer to similar parts in the various figures of the drawings.

Figure 1:
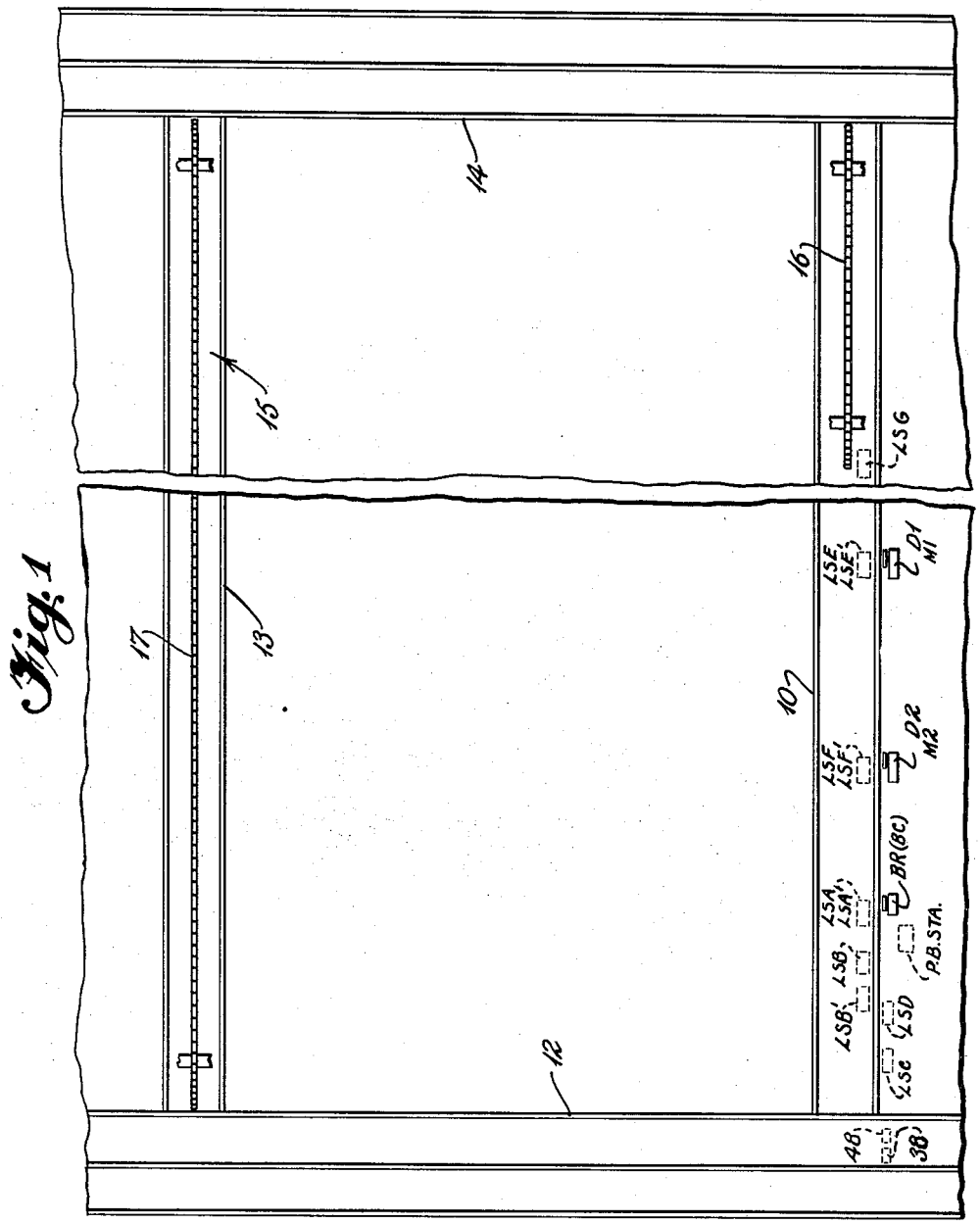
Fig. 1 is a plan view of the complete track system within a building in a grinding and polishing glass line.

In Fig. 1 there is shown a plan view of the floor of a building having typical trackage for the tables which carry the glass in a grinding and polishing operation along with the transfer trackage for bringing the tables back to the grinding and polishing line. For example, at the bottom of the figure, there is shown a return track 10 which is mounted on spaced columns 11, see Figs. 2 and 2a, in a position above the floor of the building. At the left-hand end of the building, as shown in Fig. 1, is a transversely extending transfer track 12 having three rails as shown in Fig. 2 which are mounted on columns positioning the rails slightly below the level of track 10. The transfer locomotive (not shown) runs on this track 12 as well as the portion of track 10 beyond the portion containing the chain drive 16. Still referring to Fig. 1, another track 13 is positioned along the other side of the building parallel to track 10, and it transfers the car through a grinding and polishing line generally indicated at 15 by means of a rack drive 17 to a transfer track 14 located at the opposite end of the building.

An endless chain 16 which is power-driven is positioned between the rails of track 10 shown in Figs. 1, 2 and 2a, and by suitable hook means (not shown) the tables, as generally indicated at T in Fig. 2a are movable along the right half of track 10 by the return chain 16. Tables T are supported on axles A, see Fig. 3, on which are mounted wheels W that run on the rails of the track 10.

In Figs. 2 and 2a, with Fig. 2a placed at the right of Fig. 2, there is shown starting at the left-hand end of track 10, tables T1, T2, and T3. The rails of track 10 are mounted on beams 17 which are in turn mounted on cross beams generally shown at 17' in Fig. 3 that are secured to vertical channels 11. Also mounted in suitable spaced relation along the beams 17 and adjacent the tracks 10 are drive units generally indicated at D1 and D2 with a brake unit indicated at BR (BC). Mounted above the tables T and between adjacent columns 11 are longitudinal angle bars 18 which support in a vertical adjusted position above the table certain limit switches generally designated LS.

Referring to Figs. 3 and 4, a transverse support angle bracket 19 is welded or otherwise attached to angle bar 18 and suitable bolts 20 extending through angle bar 19 support a slotted angle plate 21 to which the limit switch LS is attached along the horizontal flange 21'. Typical limit switch LS, see Fig. 4, has a feeler wheel 22 supported on a movable contact arm 23 so that it will be moved by a table pushing thereunder and will actuate switch 23' in limit switch LS there represented.

Referring to Fig. 3, a typical drive unit is generally indicated at D1 having a speed reducer SR, all as described in copending application Serial Number 454,433 filed September 7, 1954, now U.S. Patent 2,874,644, issued February 24, 1959, as indicated above. The drive units D1 and D2 have a drive wheel 29 with a rubber tire which frictionally drives against the underside of the tables T along an edge.

In Fig. 2 a brake unit BR (BC), as described in copending application Serial Number 454,433, referred to above, is mounted adjacent the tables and has a traction wheel in contact with the table to apply a retardation force when the unit is not energized.

In carrying out the invention we provide apparatus and control thereof for moving the tables leaving return endless chain 16, see Fig. 1, so that the tables are moved sequentially to the end of track 10 in order that the transfer locomotive may move the same over transfer track 12 to the grinding and polishing line generally indicated at 15. To carry this out, successive movement of the tables is accomplished by having drive units, such as, D1 and D2 mounted along the track 10 to propel the tables therealong by means of their drive wheels 29 as shown in Fig. 3. Also, a brake unit BR is provided to prevent driving the tables into the transfer pit.

The drive and brake units are of the type described in copending application Serial Number 454,433, filed September 7, 1954, as referred to above. Limit switches generally indicated at LS are positioned along the trackage on supports 18 and are connected to the respective circuits so as to prevent a table being driven, for example, by drive unit D1 when a table is positioned at D2 and interrupts the passage. So, also, movement of the tables is prevented if a table is over the brake unit BR or being moved out from the end of track 10 should it be necessary to move the transfer locomotive onto track 10 to pick up a stalled table. The means for accomplishing this sequential movement of the tables without having them butt each other and do damage to each other is shown in the detailed circuits in Figs. 5 and 5a and the general circuit arrangement in Fig. 6.

The limit switches are generally indicated as LS. These are dual switches in connection with limit switches LSA—LSA', LSF—LSF' and LSE—LSE' wherein, for example, when LSA is open, LSA' is closed. To more easily understand the operation of the system, a chart of each limit switch, its contact position, and its operation is set forth as follows:

| L. S. | Designation | Contact | Operation |
| --- | --- | --- | --- |
| LSA | 3rd limit | N.C.[1] | Prevents M1 and M2 from running when table is at position of brake. |
| LSA' | | N.O.[2] | In series with LSE' and LSF' and when all closed by presence of tables slows return chain 16. |
| LSB | 1st cut-out | N.C. | Sets brake BC (BR). |
| LSB' | 2nd cut-out | N.O. | In series with LSC or LSD, releases brake through relay R1. |
| LSC | 1st transfer | N.O. | Releases brake, through relay R1, while locomotive is backing past the brake. |
| LSD | 2nd transfer | N.O. | Releases brake, through relay R1, while locomotive is passing thereover. |
| LSE | 1st limit | N.C. | Starts and stops M1. |
| LSE' | | N.O. | Slow return chain with LSA' and LSF' through R2. |
| LSF | 2nd limit | N.C. | Starts and stops M2. |
| LSF' | | N.O. | Slows return chain with LSA' and LSE' through R2. |
| LSG | | N.O. | Stops return chain through LSA', LSE', and LSF'. |

[1] Normally closed.
[2] Normally open.

Power supply voltage is provided by the main lines, LI, LII, and LIII, through circuit breakers SB1 and SB2 for the drive units M1 and M2. Control voltage is tapped off from lines LI and LII through the disconnect switch 31 to transformer 30 to supply a control voltage of the order of 115 volts to lines L1A and L2A. An electrically operated contactor 32 having three poles is indicated in Fig. 5a and is operated by the solenoid LE across lines L2A and 13. Contacts LE' serve as a holding circuit about the pushbutton "start switch" 46 of the "start" and "stop" P.B. station switches. It will be noted that Fig. 6 and Fig. 5a show these P.B. switches with the "stop" switch 47 between lines 11 and 12 and the "start" switch 46 between lines 12 and 13. An "emergency stop" switch 48 is in series with switches 46 and 47. The contactor 32 also closes contacts LE'' and LE''' which cut in power from line L2A to line L2 and from L1A to line L1 as shown in both Figs. 5a and 6. Thus, the voltage control lines L1 and L2 for the operation of the control circuits are energized.

A terminal block 34 is utilized in making circuits between the respective circuit breakers and various contactors and the limit switches as well as the other switch members to provide a means of facilitating the connection of the circuits and the running of the electrical conductor. The circuitry also includes a contactor unit 35, which includes brake control contacts BC1, that supplies power to switch LSF through line 16, contacts BC2 to limit switch LSA through line 15 and contacts BC3 to a brake unit BR through line 7.

Drive unit D1 controls

Control for drive unit D1 and its motor M1 is through a solenoid S1 which in turn controls the circuit breaker SB1. This circuit breaker SB1 connects the main lines LI, LII, LIII with the respective lines a, b, c, through a reversing switch generally indicated at 33 and then to the actual motor M1 for the drive unit D1. In each of the circuits for the motors M1 and M2 there is an overload OL1 and OL2 associated in the respective circuit breakers SB1 and SB2.

In the control circuit for M1 and the solenoid S1 thereof, the solenoid is energized through lines L2 and 8'. Line 8' is connected to line 8 which is connected in series with three parallel lines comprised of limit switch LSE, contacts 62, and toggle switch TS1. LSE is normally closed unless a car is moved thereunder and thus when closed a circuit is completed from control line L1 through LSE, line 8, to solenoid S1 and back to line L2. This causes circuit breaker SB1 to be closed and power is supplied to M1.

Contacts 62 are actuated in the circuit breaker SB2 and thus when motor M2 is running to drive a table along, circuit breaker SB2 being closed, contacts 62 are closed, and thus they initiate a circuit to S1 and start motor M1 of drive unit D1. Thus, if a table is under LSE and it opens that switch, a parallel circuit is closed to S1 through contacts 62 when the table moves over drive unit D2, and a table is moved along from under limit switch LSE by its drive unit D1.

Drive unit D1 may also be actuated manually by closing toggle switch TS1 when the other two parallel branches, LSE and 62, see Fig. 6, are open.

Drive unit D2 controls

A circuit similar to that controlling solenoid S1 is provided for solenoid S2 to control circuit breaker SB2 to energize motor M2. This circuit includes a circuit breaker SB2 and reversing switch 39, identical to SB1 and 33, respectively. Solenoid S2 is connected between control lines L1 and L2, see Fig. 6, by means of a circuit in series with three parallel branches through line 5, namely, LSF and BC1 in one branch, LSA and BC2 in the second branch and toggle switch TS2 in the third branch.

The brake unit BR is normally set when not energized. When brake coil BC is energized, contactor 35 is actuated and contactors BC1, BC2, and BC3 are closed to complete circuits. Upon energizing solenoid BC through its limit switch LSB, or its holding contracts 60 by means of relay R1, contactors BC1, BC2 and BC3 are closed to complete circuits, and a table is moved to the LSB position as indicated at T1 in Fig. 2 and thus BC1 is closed to complete the circuit through LSF, through the solenoid S2 to start motor M2 so as to move a table, such as T2 on to the broken line position as shown in Fig. 2a and thence on to the brake BR.

So, also, limit switches LSA and LSA' are actuated when a car T1 is at LSB, see Fig. 2, and thus a circuit is completed through LSA, contacts BC2 to solenoid S2 for motor M2 to start the same and move a table along to the brake. In case of necessity, the toggle switch TS2 can be used manually to move a table.

Brake unit conrtols

When the solenoid BC for the brake control is closed, it closes contactors BC3 and in turn energizes the brake BR as shown in Fig. 2 to release the same. Solenoid BC can be energized through the limit switch LSB or contactor 60, each of which is in series with line 2 to connect the solenoid across the control lines L1 and L2 as shown in Fig. 6.

When a table moves over the brake BR and approaches and contacts first LSB and then LSB', LSB which is normally closed is opened and the circuit to the solenoid BC to control the brake is opened, and thus the brake places a drag on the table to stop same and to prevent it from running into the transfer tracks 12.

When it is desired to release the brake, relay R1 is used, and this actuates the contact 60. Relay R1 is included in the contactor unit 36 and this contactor unit has contacts 60 and 60', contactors 60 being a holding circuit for the solenoid BC for the brake. Contactor 60' serves as a holding circuit in series with the relay R1, the limit switch LSB', and lines 1 and 3, as shown in Fig. 6.

Limit switch LSB' is in series with three parallel branches consisting of the contact 60', the limit switches LSD and LSC, respectively. When the table has been retarded, it finally stops with its advancing end under LSB' to close the same. Thus, a series circuit is made ready for either LSC, LSD or 60' to complete. Initially relay R1 is actuated when LSB' and either LSC or LSD are closed. Contactor 60' keeps relay R1 closed as long as LSB' is kept closed.

Limit switches LSC and LSD are utilized when the transfer locomotive is run in from the left from tracks 12 onto tracks 10 as shown in Fig. 2 to pick up a table, and thus to release the brake. These limit switches LSC and LSD are shown also in Fig. 1 in their relative position along track 10.

To actuate relay R1, the car is under limit switch LSB' to close the latter, and while it is closed, the transfer locomotive approaches first limit switch LSC and then LSD both of which complete a circuit through LSB' to relay R1 which is actuated to close contact 60' which provides a holding circuit shunting limit switches LSC and LSD.

It is, of course, necessary that the brake BR be releaesd so that the table may run out, and this is accomplished as relay R1 actuates contact 60 which completes a circuit to the solenoid BC which closes contacts BC1, BC2 and BC3, the latter of which completes a circuit to energize and thus release BR.

Additional safety features

Limit switch LSA' is series connected through line 4 to limit switch LSF', which, in turn, is series connected through line 6 to limit switch LSE' to form a connecting circuit. As seen in the bottom of Fig. 6, the connecting circuit is connected between control lines L1 and L2 through two parallel branches, one containing a relay R2, and the other containing limit switch LSG (located at the end of the return chain 16 as seen in Fig. 2a) and a relay RC. The latter relay is shown in Fig. 5a coupled to contactors 37 which are in the return chain control circuit and must be closed to operate the latter.

When switch LSF is actuated to open position, its companion switch LSF' is closed. Limit switches LSA' and LSE' are also closed when their companion switches are actuated to open position. With switches LSA', LSF' and LSE' closed because tables are occupying their positions, there is formed a closed series circuit with limit switch LSG. When the return chain 16 conveys an additional table to occupy limit switch LSG, relay RC is actuated by the potential difference impressed thereacross to open the return chain drive control circuit. The return chain is stopped, thus avoiding a jam in the track section leading to the transfer pit.

Relay R2, as shown in Fig. 7, has shunted therearound a field rheostat for control purposes of the return chain control and its drive. Relay R2 is actuated when LSA', LSF' and LSE' are all closed simultaneously by the presence of tables at their locations. Relay R2 operates the contactors indicated at 38 to control the field rheostat which is also diagrammatically shown in Fig. 7. The setting on the field rheostat determines the reduction of speed effected on the chain drive operation when tables close all three series-connected limit switches.

The emergency stop and the PB station for "start" button 46 and for "stop" button 47 is indicated in Fig. 1 over track 12 adjacent the end of track 10. In Fig. 6 the "emergency stop" 48 in series with the control line circuit L1A and 11, "stop" switch 47, line 12, "start" switch 46, line 13, and relay LE and thence line L2A serves to break this series circuit in case of a jam-up or for other reasons it is found necessary to actuate the "emergency stop" switch.

In the system here shown, provision has been made in positioning the drive units and the limit switches such that the action of the transfer locomotive to pull out cars or tables from track 10 is not hampered. The brake is automatically released by the locomotive and held released by the holding contacts through limit switches LSC and LSD. This feature is particularly useful in case of any breakdown of the separate drive units in the transfer system. Through the use of our table transfer system a lesser number of tables are needed and at the same time damage to the tables caused by bumping one another is eliminated.

We claim as our invention:

1. A system for successively moving cars on a track comprising, in combination, a track, cars mounted on the track for movement therealong, a drive unit for the cars, a brake for the cars and a cut-out switch mounted sequentially in the direction of movement of said cars on said track and in spaced relation along the track for opening by a car; said drive unit having driving means to engage passing cars for propelling the cars along the track; a power supply for the drive unit including a circuit breaker and circuit breaker actuating means for actuating the circuit breaker; electrical energizing means connected to said brake to release said brake when energized; the cut-out switch being electrically connected with said electrical energizing means for the brake and opened by contact of a passing car to deenergize said brake thereby causing a braking action on a car contacted by said brake; a normally closed limit switch positioned along said track adjacent said drive unit and electrically connected with said circuit breaker actuating means to form a first alternate circuit for energizing said circuit breaker actuating means whereby said first alternate circuit to the circuit breaker actuating means is opened; said limit switch being opened by a passing car; circuit contacts being in parallel circuit with said limit switch and said circuit breaker actuating means, said circuit contacts having actuating means associated with and responsive to energization of said brake energizing means to close said circuit contacts thereby to complete a second alternate circuit to said circuit breaker actuating means, said alternate circuits causing said drive unit to move a car toward said brake.

2. The combination according to claim 1, including a second cut-out switch located along the track beyond said first cut-out switch in the direction of movement of said cars and closed by a passing car, a relay having an energizing means, a first set of relay contacts and a second set of relay contacts, said second set of relay contacts being electrically connected to said relay energizing means and acting as a holding circuit for the relay when closed, said second cut-out switch being connected to said relay energizing means and forming additional means for energizing said relay, said first and second sets of relay contacts coupled to said relay to be closed when the relay is energized, said first set of relay contacts being in circuit with said electrical energizing means connected to said brake to energize the brake and make it non-braking independently of the operation of the first cut-out switch.

3. The system according to claim 2, wherein the track includes a terminal track section leading to a transfer track, said terminal track section being located beyond the second cut-out switch that is closed by the presence of a car to be removed, a normally opened transfer locomotive operated limit switch located along said terminal track section and closed upon passage of a transfer locomotive, said transfer locomotive operated limit switch being electrically connected to said relay through said second cut-out switch to close an alternate electric circuit to release the brake.

4. A system for successively moving cars on a track section according to claim 1 including a return chain section according to claim 1 including a return chain and drive means therefor along said track positioned before said drive unit in a direction reverse to the direction of movement of said cars and a control circuit for said return chain drive means, said control circuit comprising a series of spaced secondary limit switches normally open and positioned along said track for closing by different cars moving therealong, said secondary limit switches being electrically connected in series to form a connecting circuit, and a field rheostat for the return chain drive means, relay means connecting the field rheostat with the return chain drive means, said connecting circuit formed by said secondary limit switches being connected to said last named relay means for actuating the same, thereby upon simultaneous closure of all said secondary limit switches to slow the operation of said return chain drive means.

5. A system for successively moving cars on a track section according to claim 1 including a return chain and drive means therefor along said track positioned before said drive unit in a direction reverse to the direction of movement of said cars and a control circuit for said return chain drive means, said control circuit comprising a series of spaced secondary limit switches normally open and positioned along said track for closing by different cars moving therealong, said secondary limit switches being electrically connected in series to form a connecting circuit, a return chain limit switch normally open and in series with a relay control for said return chain drive means, said return chain limit switch being located adjacent the car exit end of the return chain and adapted to be closed by a car moving thereby, the return chain limit switch being series connected with said connecting circuit, whereby when said secondary limit switches and said return chain limit switch are all closed, the relay control is actuated to stop said return chain drive means.

6. A system for successively moving cars on a track according to claim 1 including a return chain having a car entrance and a car exit end and drive means therefor along said track before said drive unit, a control circuit for said return chain drive means, said control circuit comprising a series of spaced secondary limit switches normally open and positioned along said track for closing by different cars moving therealong, said secondary limit switches being electrically connected in series to form a connecting circuit, and a field rheostat for said return chain drive means and having operating means connected to said connecting circuit and actuated upon closure of all said secondary limit switches to slow the operation of said return chain drive means, a branch circuit parallel to said field rheostat comprising a return chain limit switch normally open and in series with a relay control and said return chain drive means, said return chain limit switch being located adjacent the car exit end of the return chain and adapted to be closed by a car moving thereby, whereby when said secondary limit switches and said return chain limit switch are all closed, the relay control is actuated to stop said return chain drive means.

7. A system for successively moving cars on a track according to claim 1 including a control for a control power circuit for supplying power to said circuit breaker actuating means, said cut-out switch, said electrical energizing means for the brake and said normally closed limit switch, said control circuit comprising a start and a stop switch in series, a start relay having holding contacts operable thereby and in parallel with said start switch and a first and second set of contacts operable by said start switch to open and close said control power circuit.

8. A system for successively moving cars on a track comprising, in combination, a track, cars mounted on the track for movement therealong, a drive unit, a brake, and a normally closed cut-out switch mounted sequentially in the direction of movement of said cars on said track and in spaced relation along said track, said drive unit having driving means to engage passing cars to propel them along the track, a power supply for the drive unit including a circuit breaker and circuit breaker actuating means for the circuit breaker, electrical energizing means coupled to the brake to release the latter, said cut-out switch being electrically coupled with said electrical energizing means and opened by contact of a passing car to deenergize the brake unit to set said brake, a normally closed limit switch positioned along said track adjacent said drive unit and electrically coupled with said switching means to form a first alternate circuit, said limit switch being opened by a passing car, circuit contacts in parallel with said limit switch and in series with said circuit breaker actuating means, said circuit contacts being responsive to actuation by said electrical energizing means to complete a circuit to said circuit breaker actuating means to cause the drive unit to move a car toward the brake, a second cut-out switch located along the track in the direction of movement of the cars beyond the first cut-out switch and closed by a passing car, a relay in series therewith, said relay when energized closing a first set and a second set of relay contacts, said first set of relay contacts being in parallel with said first cut-out switch and in series with said electrical energizing means to release the brake, a normally open transfer locomotive operated limit switch located beyond said second cut-out switch along said track in the direction of movement of said cars and closed upon passage of a transfer locomotive, said transfer locomotive operated limit switch being connected in series to said relay through said second cut-out limit switch and in parallel to said second set of relay contacts to provide alternate parallel electrical circuits to release the brake.

9. A system for successively moving cars on a track without butting each other comprising, in combination, a track; cars mounted on the track for movement therealong; a first drive unit, a second drive unit, a brake means and a normally closed brake switch, mounted sequentially in the direction of movement of said cars on said track and in spaced relation therealong, said drive units having driving means engaging passing cars to propel them along the track, said brake means having engaging means to arrest the movement of a car passing thereby; a power source, first and second circuit breakers connected to the power source and respectively to said first and second drive units and circuit breaker actuating means for each circuit breaker; a contactor having a first, a second and a third pair of electrical circuit contacts and a contactor actuating means therefor; a first and a second control power supply line; one terminal of said contactor actuating means being connected to said second line of the control power, said brake switch having one terminal connected to said first line of the control power and another terminal connected to said contactor actuating means whereby on the absence of a car at said brake switch, said contactor actuating means actuates said contactor contacts to closed position; one terminal of each of said first and second circuit breaker actuating means being connected to said second line of the control power; a first normally closed limit switch positioned along said track adjacent said first drive unit in the direction of car movement for actuation to open position by a passing car, said limit switch having one terminal connected to the first line of the control power and the other terminal to the other terminal of said first circuit breaker actuating means; a second normally closed limit switch positioned along said track and spaced beyond said second drive unit in direction of car movement and having one terminal connected to said first line of the control power and the other to one contact of said first pair of contacts; a third normally closed limit switch positioned along said track and spaced beyond said second limit switch in the direction of car movement and having one terminal connected to said first line of the control power and the other to one contact of said second pair of contacts, said other contacts of said first and second pair being connected to the other terminal of said second circuit breaker actuating means, one terminal of said third pair of contacts of the contactor being connected to a terminal of said brake means and the other terminal of said third pair of contacts being connected to the first line of the control power; another terminal of the brake means being connected to the second line of the control power whereby upon the presence of a car at said brake switch, said brake switch opens to interrupt the circuit to said contactor actuating means which opens said contactor contacts and the circuits controlled thereby; a pair of holding contacts for said first circuit breaker actuating means actuated by said second circuit breaker actuating means and having one of the contacts thereof connected to said first line of the control power and the other contact thereof to said other terminal of the first circuit breaker actuating means; said third limit switch and said second set of contacts of the contactor providing a second circuit for energizing the second circuit breaker actuating means to actuate the second drive unit to move a car passing thereover toward the brake.

10. The combination according to claim 9 including a second brake switch positioned along said track beyond said first brake switch in the direction of car movement and closed by a car passing thereby, a relay having a first and a second pair of relay operated contacts and a relay actuating means, one terminal of the relay actuating means connected in series with one terminal of said second brake switch and the other terminal of the relay actuating means connected with said second line of the control power, first contacts of said relay first and second pair of relay contacts being connected to each other and to said first line of the control power, the second contact of the first pair of relay contacts being connected to said other terminal of said contactor actuating means, the second contact of the second pair of relay contacts being connected to the other terminal of said second brake switch whereby said relay actuating means is in series with said second brake switch and said first pair of relay contacts are in parallel with said normally closed brake switch and upon closure of said first pair of relay contacts there is established a secondary circuit to said contactor actuating means to close the contacts thereof and the circuits connected therewith; a terminal track beyond the brake means in the direction of car movement and leading to a transfer track, first and second transfer locomotive operated limit switches positioned along said terminal track, said first transfer switch being adjacent the end of said terminal track and said second transfer switch being positioned intermediate said first transfer switch and said brake means, said first and second transfer switches and said second set of relay contacts being connected in parallel to form a series circuit with said second brake switch, said first and second transfer switches having one terminal thereof connected to said first line of control power, said first and second brake switches and said third limit switch all being operable also by the passage of a transfer locomotive movable onto and off of the terminal track to pick up a car, whereby said second set of relay contacts forms a holding circuit for the relay actuating means when said second brake switch is closed by the presence of a car thereby and said brake means is held released while the transfer locomotive moves onto the track to pick up a car thereon.

11. A system for successively moving cars on a track according to claim 9 including a return chain for moving cars along said track and positioned before said first drive unit in the direction from which cars move, drive means for the return chain, a control circuit for said return chain drive means, said control circuit comprising a seies of spaced secondary limit switches normally open and positioned along said track in the direction of car movement for closing by cars moving therealong, said secondary limit switches being electrically connected in series, a field rheostat means connected to said series circuit of the secondary limit switches to control said return chain drive means, said first and second lines of the control power being connected and feeding said last mentioned series circuit, said rheostat means being actuated when all of said secondary limit switches are closed by cars passing thereby whereupon to slow the operation of said return chain drive means.

12. A system for successively moving cars on a track section according to claim 11 including a return chain drive means limit switch normally open and in series with a second relay control means for said return chain drive means, said return chain limit switch being located adjacent the end of the return chain along the track in the direction of car movement and adapted to be closed by a car moving thereby, the return chain limit switch second relay control means series circuit being series connected with said series circuit of the secondary limit switches, whereby when said secondy limit switches and said return chain limit switch are all closed, the second relay control means is actuated to stop said return chain drive means.

13. A system for successively moving cars on a track according to claim 9 including a contactor for the control power supply having three pairs of contacts and a contactor actuating means, the first of said pair of contacts having one contact connected to a first power supply line and the other to said first control power supply line, the second pair of contacts having one contact connected to a second power supply line and the other to said second control power supply line, a normally open start and a normally closed stop switch in series circuit with one terminal of said last mentioned contactor actuating means, the other terminal of said just mentioned contactor actuating means connected to said second power supply line, said start switch having a terminal connected to said first power supply line, said third pair of contacts having their respective contacts connected to the terminals of said start switch and in parallel therewith thereby forming a holding circuit for said start switch for continued energization of said contactor actuating means of the control power contactor.

References Cited in the file of this patent
UNITED STATES PATENTS

| | | |
|---|---|---|
| 1,078,035 | Deschamps | Nov. 11, 1913 |
| 1,095,692 | Almirall et al. | May 5, 7914 |
| 1,817,692 | Kloss et al. | Aug. 4, 1931 |
| 1,861,659 | Fox | June 7, 1932 |
| 2,194,057 | Simpson | Mar. 19, 1940 |
| 2,201,013 | Rosenthal | May 14, 1940 |
| 2,320,150 | Loughridge | May 25, 1943 |
| 2,527,244 | Culver | Oct. 24, 1950 |
| 2,595,022 | Temple | Apr. 29, 1952 |
| 2,622,861 | Talley | Dec. 23, 1952 |
| 2,684,039 | King | July 20, 1954 |
| 2,688,931 | Spafford | Sept. 14, 1954 |
| 2,714,355 | Benson | Aug. 2, 1955 |
| 2,741,190 | King | Apr. 10, 1956 |